US009024953B2

(12) United States Patent
Nagai

(10) Patent No.: US 9,024,953 B2
(45) Date of Patent: May 5, 2015

(54) IMAGE GENERATING APPARATUS, PROJECTOR, COMPUTER PROGRAM, AND IMAGE GENERATING METHOD

(75) Inventor: Kazuki Nagai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 164 days.

(21) Appl. No.: 13/405,653

(22) Filed: Feb. 27, 2012

(65) Prior Publication Data

US 2012/0229470 A1    Sep. 13, 2012

(30) Foreign Application Priority Data

Mar. 9, 2011  (JP) .................................. 2011-051334

(51) Int. Cl.
*G06T 11/20* (2006.01)
*G06F 3/0488* (2013.01)

(52) U.S. Cl.
CPC .................................. *G06F 3/04883* (2013.01)

(58) Field of Classification Search
None
See application file for complete search history.

(56) References Cited

U.S. PATENT DOCUMENTS

| 6,191,778 | B1* | 2/2001 | Chery et al. ................... 345/173 |
| 2003/0154443 | A1* | 8/2003 | Papierniak et al. ........... 715/502 |
| 2005/0027858 | A1* | 2/2005 | Sloth et al. ..................... 709/224 |
| 2006/0007190 | A1* | 1/2006 | Pettiross et al. ............... 345/179 |
| 2007/0140566 | A1* | 6/2007 | Lin et al. ........................ 382/203 |
| 2008/0119235 | A1* | 5/2008 | Nielsen et al. ................. 455/566 |
| 2010/0149206 | A1* | 6/2010 | Shigehisa et al. .............. 345/595 |
| 2013/0093666 | A1* | 4/2013 | Nagai ............................ 345/156 |

FOREIGN PATENT DOCUMENTS

| DE | 10316227 B | 7/2004 |
| JP | 06-175775 A | 6/1994 |
| JP | 2005-326940 A | 11/2005 |
| JP | 2011-2650 A | 1/2011 |
| WO | WO-9010252 A | 9/1990 |

* cited by examiner

*Primary Examiner* — James A Thompson
(74) *Attorney, Agent, or Firm* — ALG Intellectual Property, LLC

(57) ABSTRACT

A projector includes: a detecting unit that detects, from input object data indicating contents of an input object input by handwriting, graph object data indicating an drawing area for a graph and data object data indicating data for forming a graph; and an image generating unit that generates, on the basis of the graph object data and the data object data, an image including the graph in the drawing area.

20 Claims, 12 Drawing Sheets

IMAGE GENERATING APPARATUS, PROJECTOR, COMPUTER PROGRAM, AND IMAGE GENERATING METHOD

The entire disclosure of Japanese Patent Application No. 2011-51334, filed Mar. 9, 2011 is expressly incorporated by reference herein.

BACKGROUND

1. Technical Field

The present invention relates to an image generating apparatus, a projector, a computer program, and an image generating method.

2. Related Art

For example, in a classroom, a student or a teacher writes characters and the like on a whiteboard using an electronic pen in a state in which an image is displayed on the whiteboard. For example, JP-A-2011-2650 discloses a technique for generating a combined image, which is picked up by a camera and includes a locus corresponding to positions of infrared rays emitted from the tip of a pointing device, and projecting the combined image using a PC (Personal Computer) and a projector. In some case, a graph is drawn on the whiteboard or the like by hand using the pointing device such as the electronic pen, an ink pen, or the like.

However, it takes time for a user to draw a graph by hand. Further, the drawn graph is not pleasant to the eye. A method is also conceivable in which the user prepares a graph image using a PC or the like in advance and displays the graph image using a projector or the like. However, it takes time for the user to prepare the graph image in advance. Further, to correct the graph in a presentation, the user has to operate the PC or the like in a place away from a display area for an image such as the whiteboard. Therefore, the effect of the presentation is deteriorated. Moreover, this method cannot be applied when the user draws a graph by hand on the whiteboard or the like using the ink pen or the like. Therefore, the method lacks flexibility.

SUMMARY

An advantage of some aspects of the invention is to solve at least a part of the problems described above, and the invention can be implemented as the following forms or embodiments.

An aspect of the invention is directed to a projector including: a detecting unit that detects, from input object data indicating contents of an input object input by handwriting, graph object data indicating an drawing area for a graph and data object data indicating data for forming a graph; and an image generating unit that generates, on the basis of the graph object data and the data object data, an image including the graph in the drawing area.

According to the aspect of the invention, the image generating apparatus can generate a graph image according to the data input by handwriting by detecting the drawing area for the graph and the data from the input object.

The image generating apparatus can generate a graph image according to a type of a graph input by handwriting by detecting the type of the graph from the input object.

The image generating apparatus can update the type of the graph and generate the graph image according to the type of the graph updated by the handwriting input.

The image generating apparatus can update the drawing area for the graph and generate the graph image according to the drawing area for the graph updated by the handwriting input.

The image generating apparatus can update the data of the graph and generate the graph image according to the data of the graph updated by the handwriting input.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention are explained below with reference to the accompanying drawings. The embodiments explained blow do not limit the contents of the inventions described in the appended claims. All components described in the embodiments are not always essential as solving means of the inventions described in the appended claims.

First Embodiment

Figure 1:
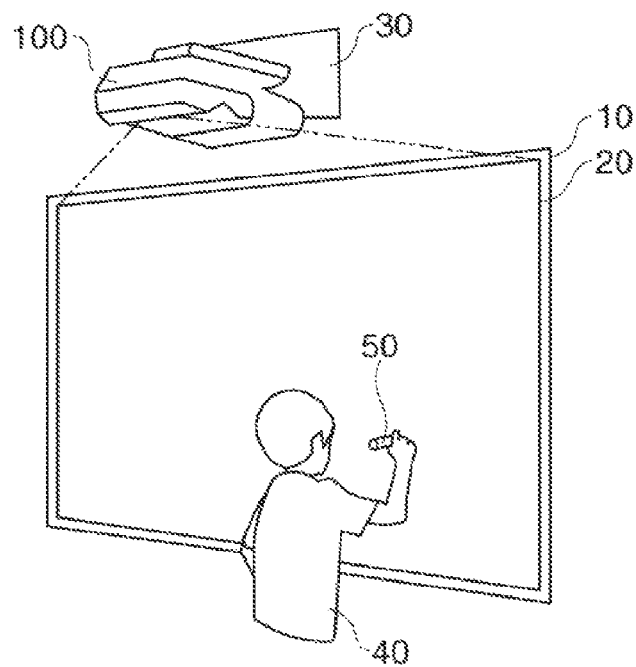
FIG. 1 is a diagram showing a projection state in a first embodiment.

FIG. 1 is a diagram showing a projection state in a first embodiment. A project 100 is a short focus type. The projector 100 projects an image 20 on a whiteboard 10 in a state in which the projector 100 is attached to the wall by a fitting 30. A student 40 draws characters, lines, and the like on the whiteboard 10 with an ink pen 50 in which a pigment or the like is filled.

Figure 2:
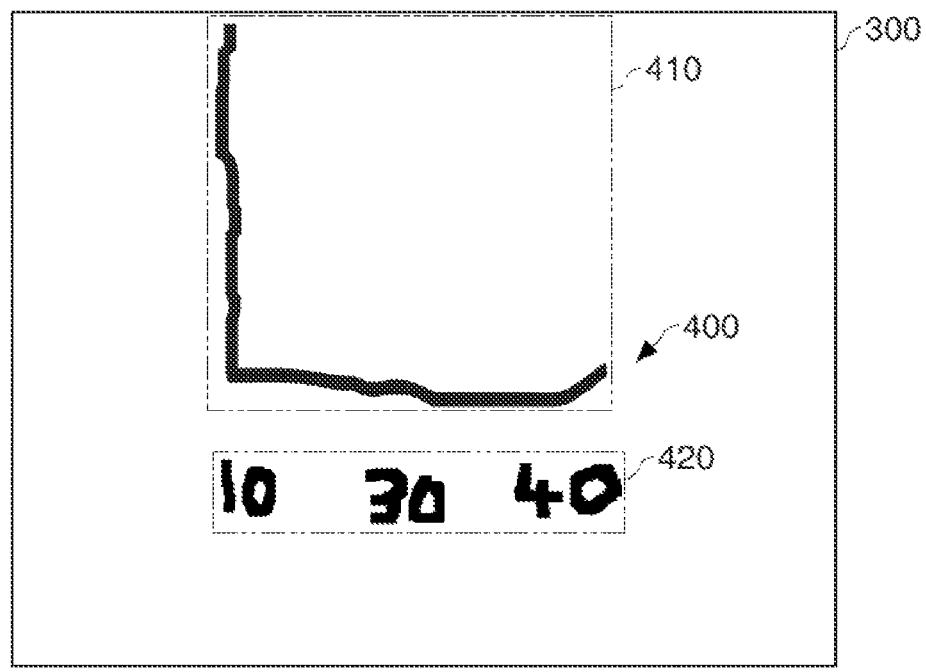
FIG. 2 is a diagram of an example of an input object in the first embodiment.

FIG. 2 is a diagram showing an input object 400 in the first embodiment. For example, the student 40 draws an L-shaped frame line as the input object 400 and draws numerical values under the frame line in a state in which an image 300 is projected. The projector 100 recognizes an area of the frame line as a graph area 410, recognizes an area of the numerical values as a data area 420, and generates a graph image according to contents of these areas and projects the graph image.

Figure 3:
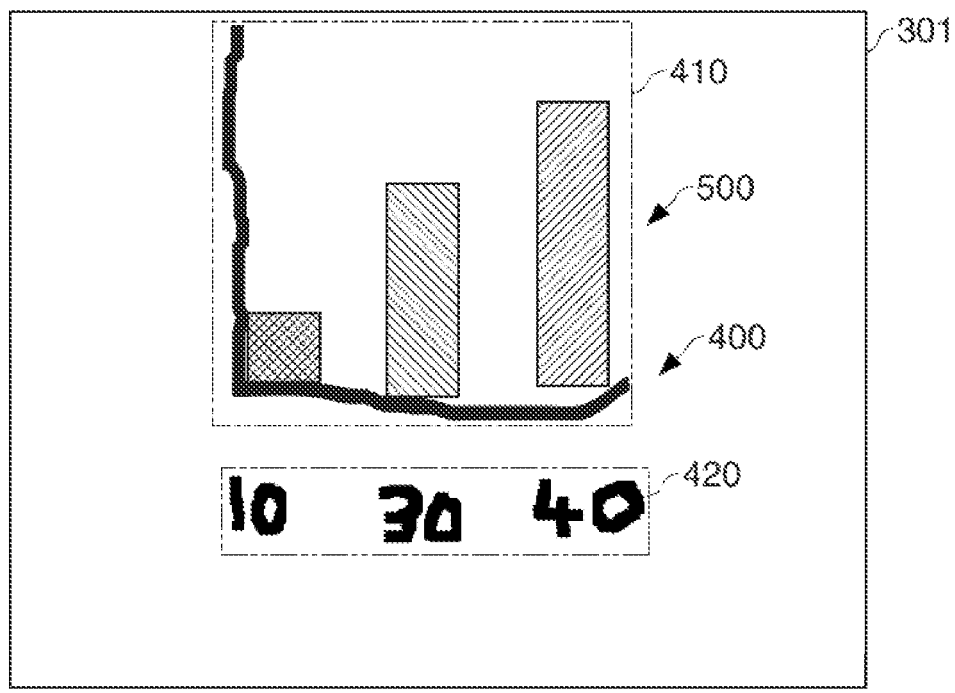
FIG. 3 is a diagram showing an example of a graph image in the first embodiment.

FIG. 3 is a diagram showing a graph image 500 in the first embodiment. For example, when "10 30 40" is drawn as numerical values of a graph as shown in FIG. 2, as shown in FIG. 3, the projector 100 generates, according to the numerical values, an image 301 including the graph image 500 in which "bar graph" set in advance as default setting is shown in the area surrounded by the frame line and projects the image 301. In this way, when there is no input indicating a type of a graph as an input object, the projector 100 projects an image including a graph image corresponding to a type of a graph corresponding to the default setting.

Figure 4:
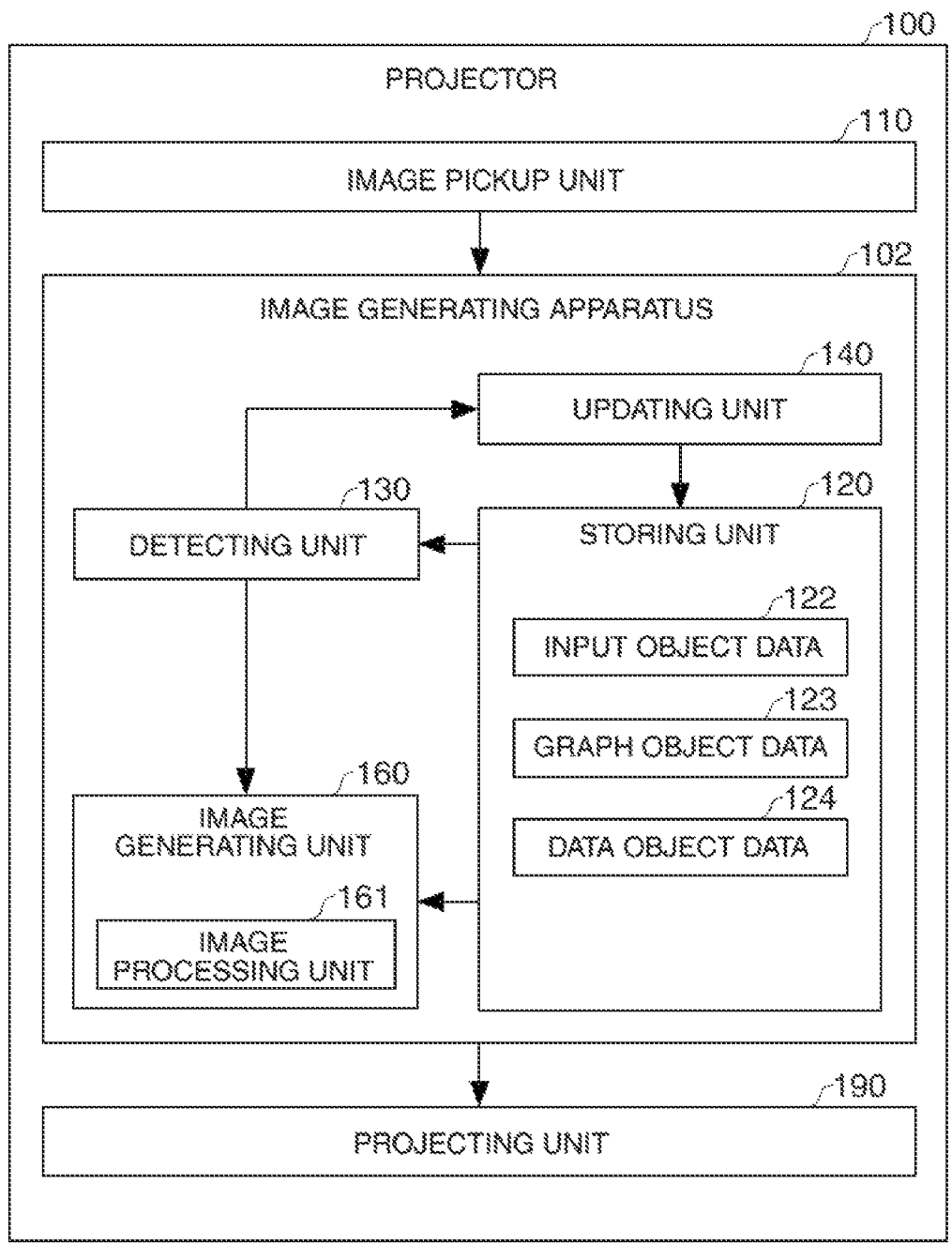
FIG. 4 is a functional block diagram of a projector in the first embodiment.

FIG. 4 is a functional block diagram of the projector 100 in the first embodiment. The projector 100 includes an image pickup unit 110, an image generating apparatus 102 that generates the image 301 or the like, and a projecting unit 190 that projects the image 301 or the like. The image generating apparatus 102 includes a storing unit 120, a detecting unit 130 that detects the graph area 410 or the like, an updating unit 140 that updates data in the storing unit 120, and an image generating unit 160. The storing unit 120 stores input object data 122 indicating the input object 400, graph object data 123 indicating data of the graph area 410, data object data 124 indicating data of the data area 420, and the like. The storing unit 120 also stores the default setting for a graph type.

The image generating unit 160 includes an image processing unit 161. The image processing unit 161 executes, on an image, image quality adjustment for adjusting brightness, contrast, and the like, image correction for correcting distortion of a projected image and the like, and character recognition and image recognition for performing feature point extraction and the like.

The input object data 122 is data indicating, for example, a coordinate position at the time of input of a handwritten character or the like (e.g., a coordinate position in a display area of a liquid crystal panel or the like or a coordinate position in a focusing area of the image pickup unit 110), an input hour, and a pixel value. The graph object data 123 is data indicating, for example, a coordinate position at the time of input, an input hour, a group ID, and a generation completion flag. The data object data 124 is data indicating, for example, a coordinate position at the time of input, an input hour, a group ID, and a generation completion flag. The Data object data 124 may be data for each numerical value or may be data for each group. When the data object data 124 is the data for each group, the data object data 124 may include data indicating the number of numerical values forming the group.

Figure 5:
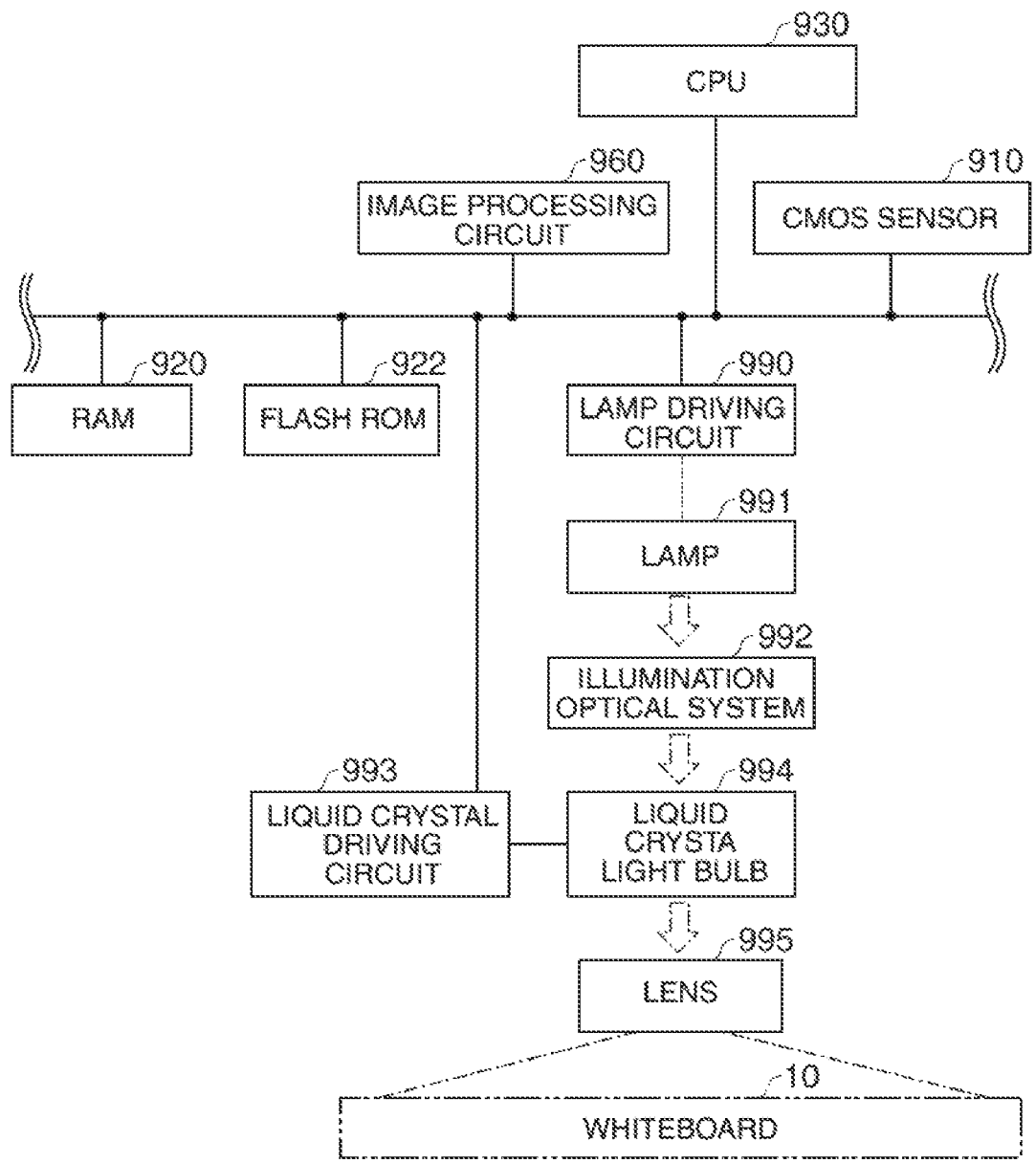
FIG. 5 is a hardware block diagram of the projector in the first embodiment.

The projector 100 may function as these units using hardware explained below. FIG. 5 is a hardware block diagram of the projector 100 in the first embodiment. For example, the image pickup unit 110 may be a CMOS sensor 910, the storing unit 120 may be a RAM 920 and a flash ROM 922, the detecting unit 130 and the updating unit 140 may be a CPU 930, the image generating unit 160 may be an image processing circuit 960, and the projecting unit 190 may be a lamp driving circuit 990, a lamp 991, an illumination optical system 992, a liquid crystal driving circuit 993, a liquid crystal light bulb 994, and a lens 995.

Figure 6:
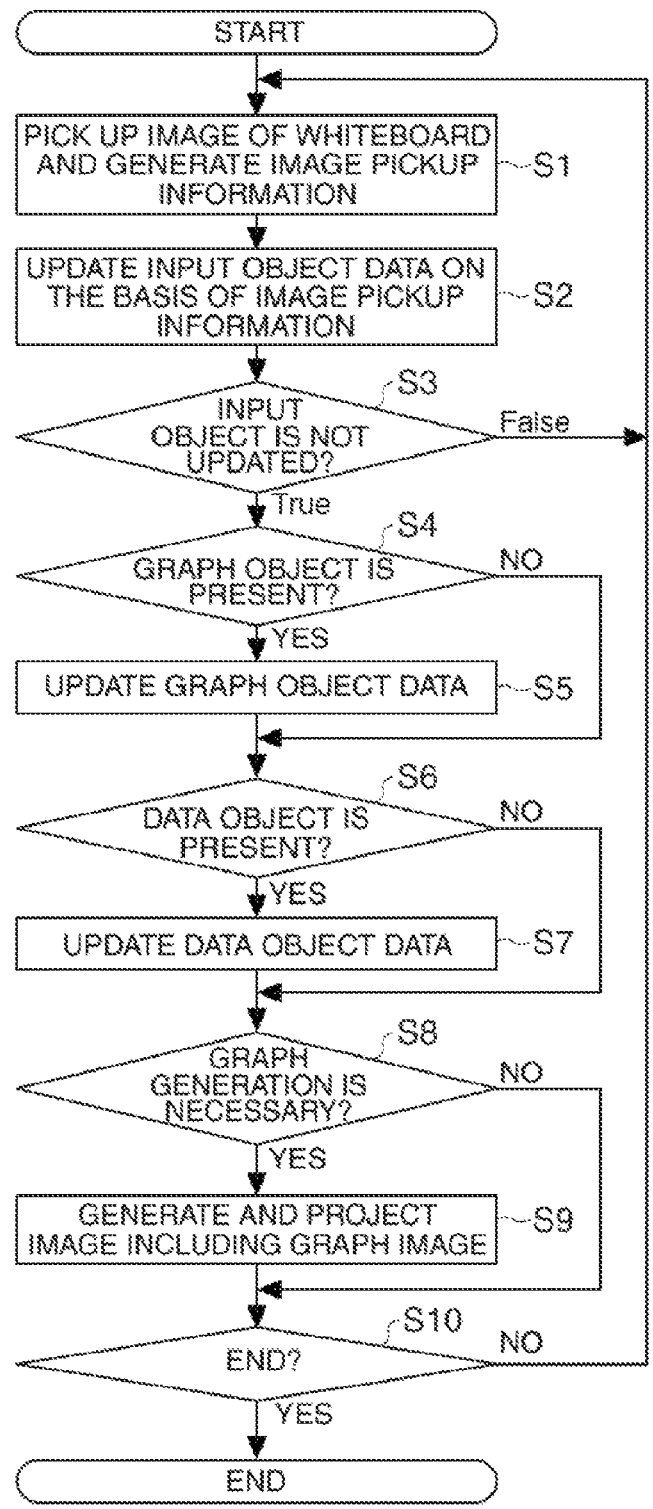
FIG. 6 is a flowchart for explaining a projection procedure for a graph image in the first embodiment.

A projection procedure for the graph image 500 is explained. FIG. 6 is a flowchart for explaining the projection procedure for the graph image 500 in the first embodiment. The image pickup unit 110 picks up an image of the whiteboard 10 at every fixed time and generates image pickup information indicating the picked-up image (step S1). The updating unit 140 updates the input object data 122 on the basis of the image pickup information or the like (step S2).

The detecting unit 130 determines, on the basis of the input object data 122, whether an input object is not updated for a fixed time (e.g., one minute) or more (step S3). If the detecting unit 130 determines that the input object is not updated (True in step S3), the projector 100 executes graph generation processing in step S4 and subsequent steps. If the detecting unit 130 determines that the input object is updated (False in step S3), the projector 100 shifts to step S1 without executing the graph generation processing in step S4 and subsequent steps.

If the detecting unit 130 determines in step S3 that the input object is not updated, the detecting unit 130 determines, on the basis of a generation completion flag or the like of the input object data 122, whether a new graph object is present (step S4). If there is a new graph object (YES in step S4), the updating unit 140 updates the graph object data 123 according to a command from the detecting unit 130 (step S5). On the other hand, if a new graph object is absent (No in step S4), the projector 100 shifts to step S6. When the graph object data 123 is updated, the detecting unit 130 determines whether the data area 420 is present below the graph area 410 in the image 300 projected by the projector 100. If the data area 420 is present, the detecting unit 130 allocates, as a group ID of the graph object data 123, an ID same as a group ID allocated to the data area 420.

The detecting unit 130 determines, on the basis of the generation completion flag or the like of the input object data 122, whether a new data object is present (step S6). If a new data object is present (YES in step S6), the updating unit 140 updates the data object data 124 according to a command from the detecting unit 130 (step S7). On the other hand, if a new data object is absent (NO in step S6), the projector 100 shifts to step S8. When the data object data 124 is updated, the detecting unit 130 determines whether the graph area 410 is present above the data area 420 in the image 300 projected by the projector 100. If the graph area 410 is present, the detecting unit 130 allocates, as a group ID of the data object data 124, an ID same as a group ID allocated to the graph area 410.

Further, the detecting unit 130 determines, on the basis of the graph object data 123 and the data object data 124, whether it is necessary to generate a graph (step S8). Specifically, for example, when data having a common group ID is present in the graph object data 123 and the data object data 124 and a value of a generation completion flag of the data is "false", the detecting unit 130 determines that it is necessary to generate a graph.

If the detecting unit 130 determines that it is necessary to generate a graph (YES in step S8), the image generating unit 160 generates the image 301 including the graph image 500 on the basis of the graph object data 123 and the data object data 124, which are the targets of the determination, and the default setting indicating a type of a graph stored in the storing unit 120. The projecting unit 190 projects the image 301 (step S9). On the other hand, if the detecting unit 130 determines that it is unnecessary to generate a graph (NO in step S8), the projector 100 shifts to step S10.

In this embodiment, it is assumed that the type of the graph is fixed to a bar graph. The detecting unit 130 causes the updating unit 140 to update values of the generation completion flags of the graph object data 123 and the data object data 124, which correspond to a group for which a graph is generated by the image generating unit 160, to "true".

The projector 100 determines whether a user instructs the end of the processing (step S10). If the user instructs the end (YES in step S10), the projector 100 ends the processing in steps S1 to S9. On the other hand, if the user does not instruct the end, the projector 100 shifts to step S1 and repeats the processing in step S1 and subsequent steps.

As explained above, according to this embodiment, the projector 100 can generate the graph image 500 according to data input by handwriting by detecting a drawing area for a graph and data from the input object 400. Further, according to this embodiment, the projector 100 can generate the graph image 500 according to the input object 400 drawn with the ink pen 50 by generating the input object data 122 using the image pickup unit 110. Therefore, the user can project the graph image 500 using various input means.

Second Embodiment

Figure 7:
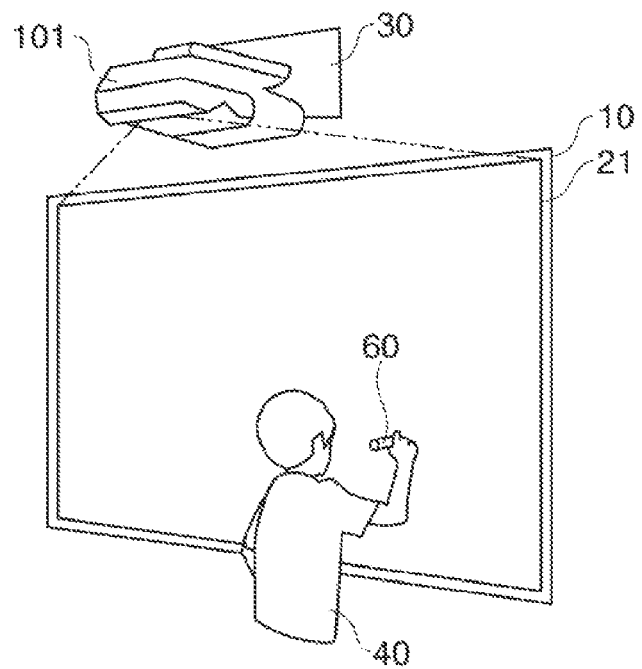
FIG. 7 is a diagram showing a projection state in a second embodiment.

An embodiment in which a user draws, for example, a type of a graph using an electronic pen and a projector projects a graph image corresponding to the type or the like is explained. FIG. 7 is a diagram showing a projection state in a second embodiment. The student 40 draws an input object on the screen 11 using an electronic pen 60.

Figure 11:
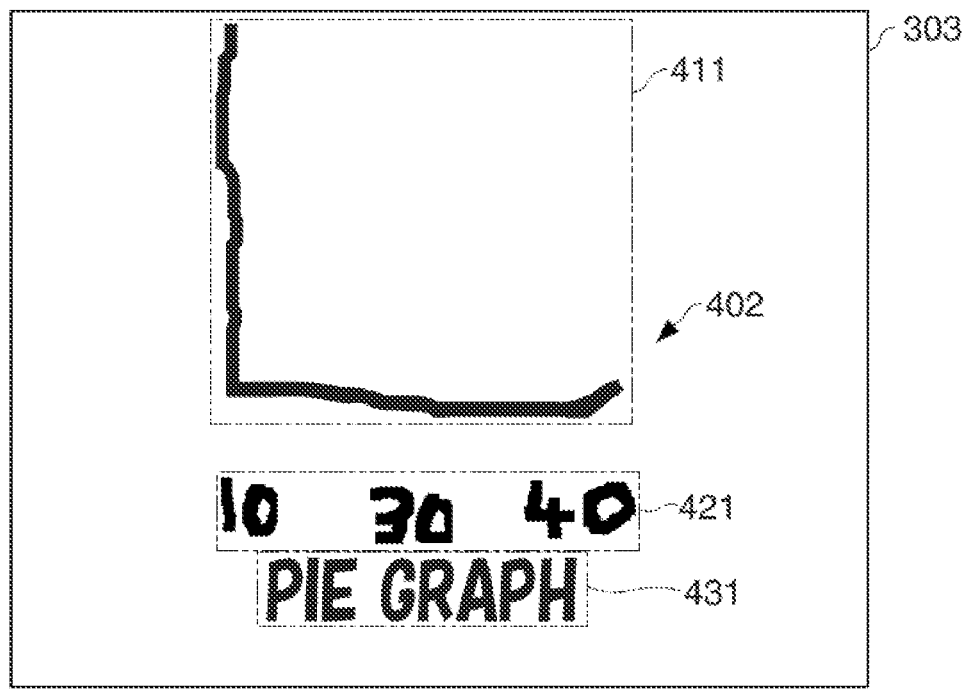
FIG. 11 is a functional block diagram of a projector in the second embodiment.

FIG. 11 is a functional block diagram of a projector 101 in the second embodiment. The projector 101 has a configuration same as the configuration of the projector 100. However, the projector 101 is different from the projector 100 in that a detecting unit 131 included in an image generating apparatus 103 detects a type object indicating a type of a graph from the input object data 122 and type object data 125 indicating the type of the graph is stored in a storing unit 121.

Figure 8:
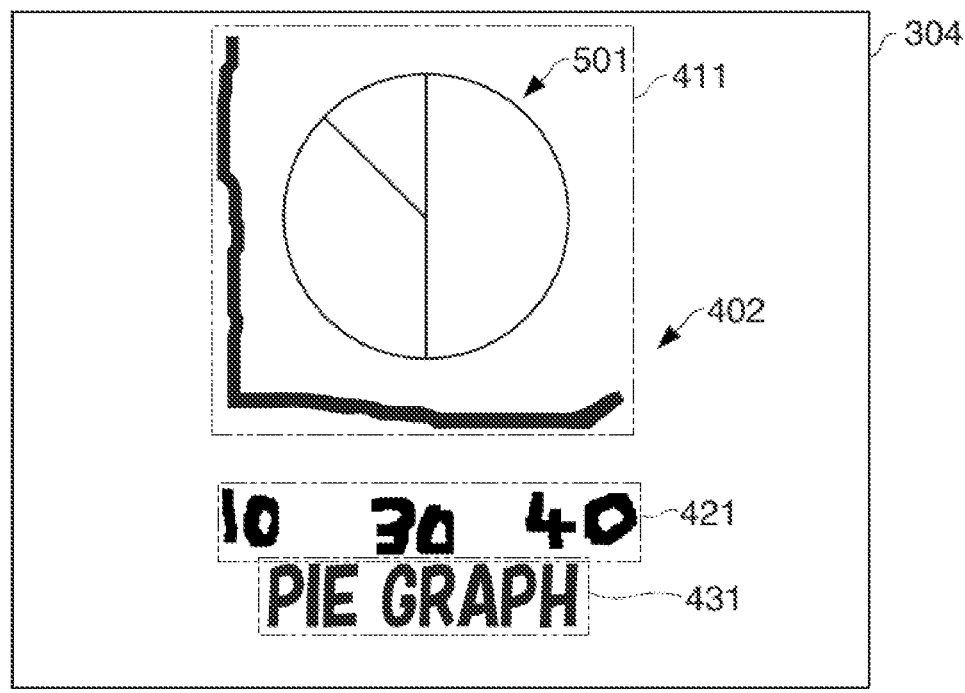
FIG. 8 is a diagram showing an example of an input object in the second embodiment.

FIG. 8 is a diagram showing an input object 401 in the second embodiment. Contents of a graph area 411 and a data area 421 in the input object 401 are the same as those in the first embodiment. However, the second embodiment is different from the first embodiment in that a type of a graph is drawn in a type area 430. In an image 302, "bar graph" is drawn as the type of the graph. A graph image 501 is an image obtained by the detecting unit 131 causing the image processing unit 161 to apply character recognition processing to a picked-up image picked up by the image pickup unit 110, discriminating a type of a graph from the type area 430, and causing the projecting unit 190 to project the type of the graph corresponding to a result of the discrimination.

Figure 9:
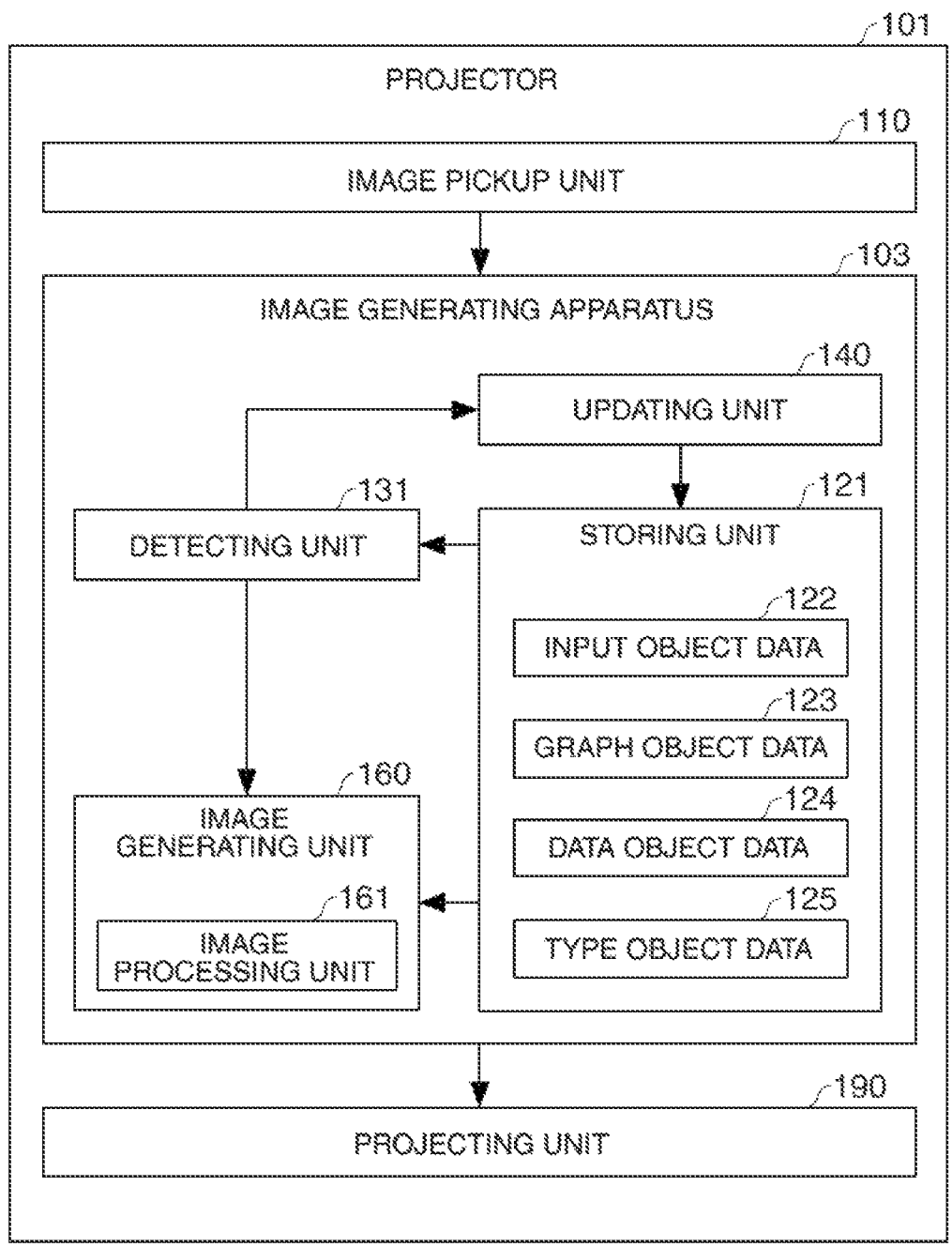
FIG. 9 is a diagram showing another example of the input object in the second embodiment.
Figure 10:
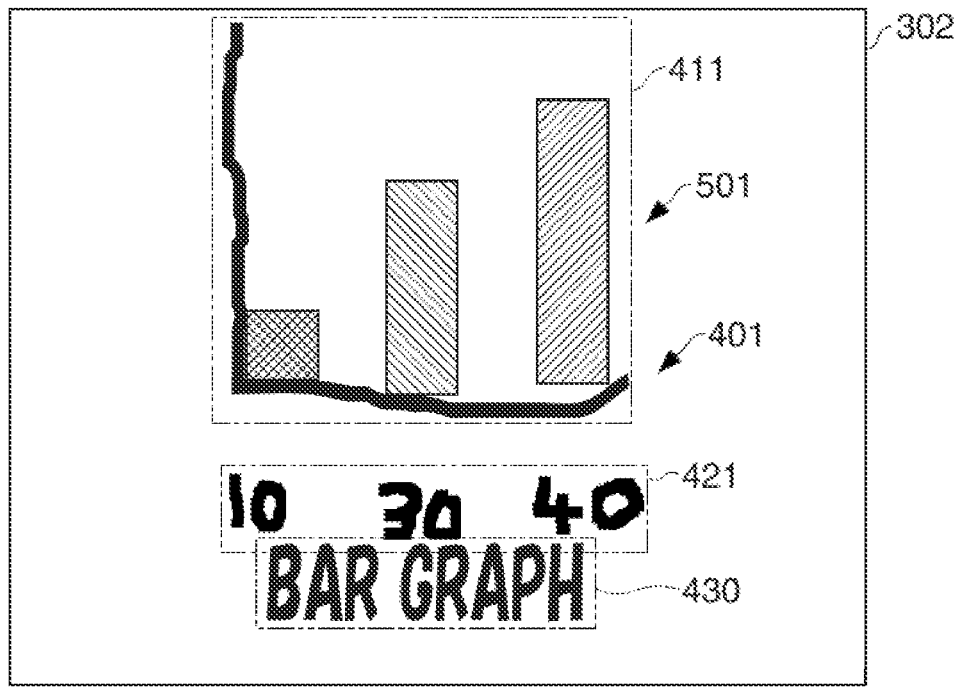
FIG. 10 is a diagram showing an example of a graph image in the second embodiment.

In this embodiment, the student 40 can change the type of the graph. FIG. 9 is a diagram showing an input object 402 in the second embodiment. As shown in an image 303, it is assumed that the student 40 erases "bar" of "bar graph" in a type area 431 and changes "bar" to "pie". FIG. 10 is a diagram showing the graph image 501 in the second embodiment. In the image 303 shown in FIG. 9, according to the rewriting of the type of the graph shown in the type area 431 to "pie graph" by the student 40, the detecting unit 131 causes the image processing unit 161 to apply the character recognition processing to the picked-up image picked up by the image pickup unit 110 and discriminates from the type area 431 that the type of the graph is "pie graph". In an image 304 shown in FIG. 10, the detecting unit 131 causes the image generating unit 160 to generate, on the basis of a determination result "pie graph", the graph image 501 indicating a pie graph corresponding to numerical values in the data area 421 and causes the projecting unit 190 to project the image 304 including the graph image 501.

Figure 12:
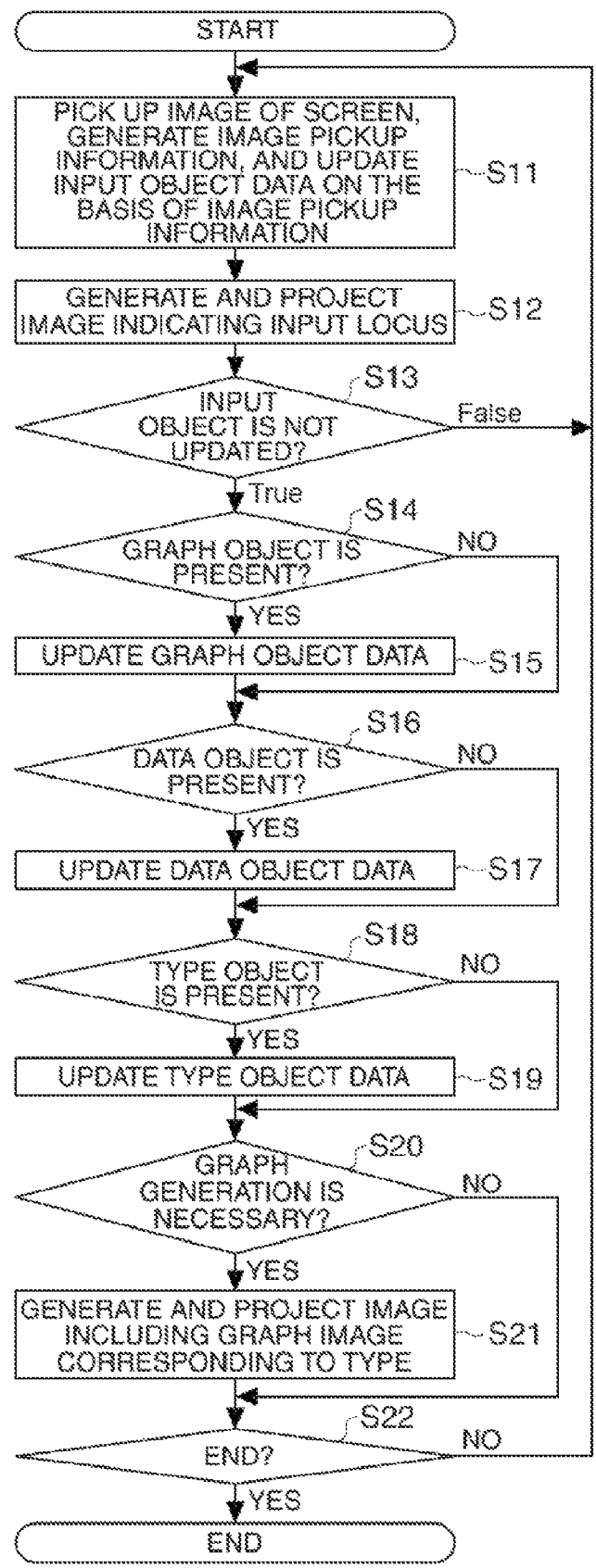
FIG. 12 is a flowchart for explaining a projection procedure for a graph image in the second embodiment.

A projection procedure for the graph image 501 using these units is explained. FIG. 12 is a flowchart for explaining the projection procedure for the graph image 501 in the second embodiment. The image pickup unit 110 picks up an image of the screen 11 at every fixed time and generates image pickup information indicating the picked-up image. The updating unit 140 updates the input object data 122 on the basis of the image pickup information (step S11). The image generating unit 160 generates, on the basis of the input object data 122, an image indicating an input locus by the electronic pen 60. The projecting unit 190 projects the image on the screen 11 (step S12).

As in the first embodiment, the detecting unit 131 determines whether an input object is not updated for a fixed time or more (step S13). If the detecting unit 131 determines that the input object is not updated (True in step S13), the projector 101 executes graph generation processing in step S4 and subsequent steps. If the detecting unit 131 determines that the input object is updated (False in step S13), the projector 101 shifts to step S11 without executing the graph generation processing in step S4 and subsequent steps.

If the detecting unit 131 determines in step S13 that the input object is not updated, the detecting unit 131 determines, on the basis of the input object data 122, whether a new graph object is present (step S14). If a new graph object is present (YES in step S14), the updating unit 140 updates the graph object data 123 according to a command from the detecting unit 131 (step S15). On the other hand, if a new graph object is absent (NO in step S14), the projector 101 shifts to step S6. When the graph object data 123 is updated, if the data area 420 or the type area 430 is present below the graph area 410, the detecting unit 131 allocates, as a group ID of the graph object data 123, an ID same as a group ID allocated to the data area 420 or the type area 430.

The detecting unit 131 determines, on the basis of the input object data 122, whether a new data object is present (step S16). If a new data object is present (YES in step S16), the updating unit 140 updates the data object data 124 according to a command from the detecting unit 131 (step S17). On the other hand, if a new data object is absent (NO in step S16), the projector 101 shifts to step S18. When the data object data 124 is updated, if the graph area 410 is present above the data area 420 in the images 302 to 304 projected by the projector 101, the detecting unit 131 allocates, as a group ID of the data object data 124, an ID same as a group ID allocated to the graph area 410. If the type area 430 is present below the data area 420, the detecting unit 131 allocates, as a group ID of the data object data 124, an ID same as a group ID allocated to the type area 430.

The detecting unit 131 determines, on the basis of the input object data 122, whether a new type object is present (step S18). If a new type object is present (YES in step S18), the detecting unit 131 causes the image processing unit 161 to execute character recognition processing and discriminates a type of a graph shown in the type area 430. The updating unit 140 updates the type object data 125 according to a discrimination result from the detecting unit 131 (step S19). On the other hand, if a new type object is absent (NO in step S18), when the type object data 125 is updated, the detecting unit 131 determines whether the graph area 410 or the data area 420 is present above the type area 430. If the graph area 410 or the data area 420 is present, the detecting unit 131 allocates, as a group ID of the type object data 125, an ID same as a group ID allocated to the graph area 410 or the data area 420.

Further, the detecting unit 131 determines, on the basis of the graph object data 123, the data object data 124, and the type object data 125, whether it is necessary to generate a graph (step S20). Specifically, for example, if data having a common group ID is present in the graph object data 123, the data object data 124, and the type object data 125 and a generation completion flag of the data is "false", the detecting unit 131 determines that it is necessary to generate a graph.

If the detecting unit 131 determines that it is necessary to generate a graph (YES in step S20), the image generating unit 160 generates the image 304 including the graph image 501 on the basis of the graph object data 123, the data object data 124, and the type object data 125, which are the targets of the determination. The projecting unit 190 projects the image 304 (step S21). On the other hand, if the detecting unit 131 determines that it is unnecessary to generate a graph (NO in step S20), the projector 101 shifts to step S22.

It is assumed that the pie graph is a graph in which numerical values are arranged clockwise in order from a largest numerical value. The detecting unit 131 causes the updating unit 140 to update values of the generation completion flags of the graph object data 123, the data object data 124, and the type object data 125, which correspond to a group for which a graph is generated by the image generating unit 160, to "true". If "bar" of "bar graph" is changed to "pie" in a state in which the graph is generated, data indicating the "pie" is generated in the input object data 122 as a new input object. Therefore, the detecting unit 131 can determine that the new input object is present in the type area 430. The detecting unit 131 can cope with a change of a type or the like by also causing the updating unit 140 to update the generation completion flag from "true" to "false" in the original portion of "graph" according to the determination.

The projector 101 determines whether a user instructs the end (step S22). If the user instructs the end (YES in step S22), the projector 101 ends the processing in steps S11 to S22. On the other hand, if the user does not instruct the end, the projector 101 shifts to step S1 and repeats the processing in step S1 and subsequent steps.

As explained above, according to this embodiment, the projector 101 realizes operational effects same as those in the first embodiment. According to this embodiment, the projector 101 can update a type of a graph and generate the graph image 501 according to a type of a graph updated by handwriting input.

Other Embodiments

The invention is not limited to the embodiments explained above and modification of the embodiments is possible. For example, the configurations of the embodiments may be combined. The arrangement of the graph area 410, the data area 420, and the type area 430 is not limited to the arrangement in the embodiments explained above.

Figure 13:
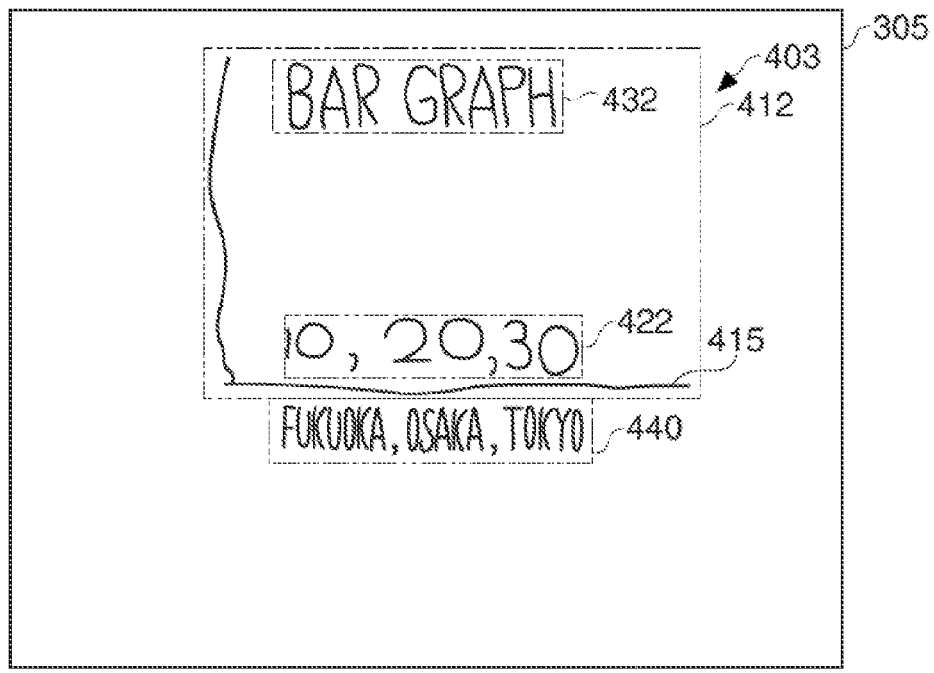
FIG. 13 is a diagram showing an example of an input object in another embodiment.

FIG. 13 is a diagram showing an input object 403 in another embodiment. The input object 403 in an image 305 is drawn by the electronic pen 60. A type area 432 and a data area 422 are arranged in a graph area 412. An attribute area 440 indicating an attribute (in this embodiment, a city name) for each numerical value of the data area 422 is provided on the outside of the graph area 412. Numerical values in the data area 422 are delimited by commas.

Figure 14:
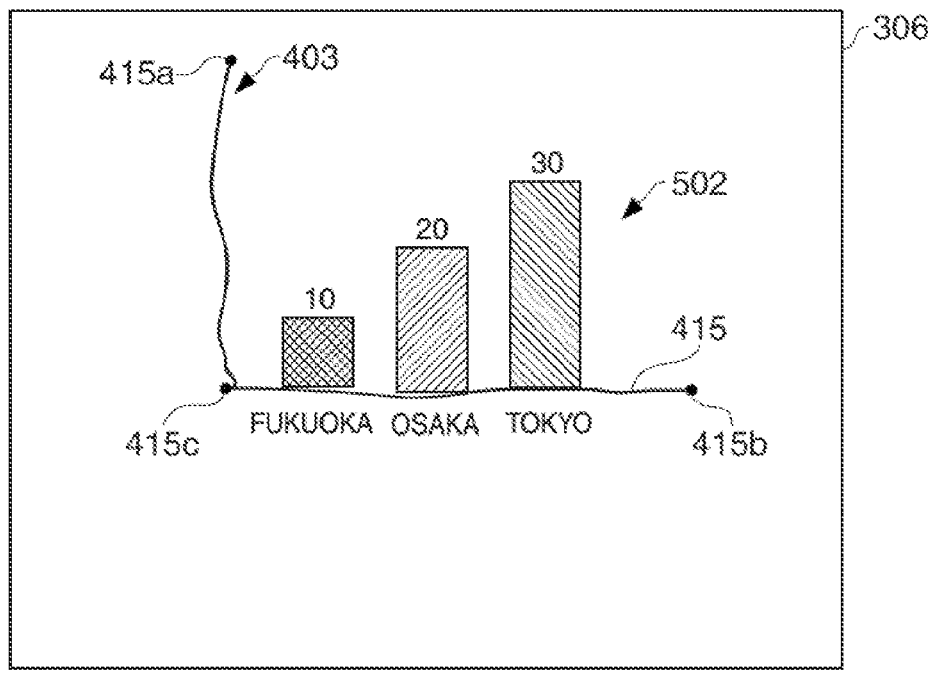
FIG. 14 is a diagram showing an example of a graph image in the other embodiment.

FIG. 14 is a diagram showing an example of a graph image 502 in the other embodiment. The image generating unit 160 included in the projector 101 erases input objects included in the data area 422, the type area 432, and the attribute area 440 from the input object 403 on the basis of the graph object data 123, the data object data 124, and the type object data 125. The image processing unit 161 performs character recognition processing, whereby a type of a graph is discriminated. The image generating unit 160 generates an image 306 including the graph image 502. The projecting unit 190 projects the image 306. The image processing unit 161 can perform the character recognition processing for a character as long as the character corresponds to a character code. The image processing unit 161 can also perform the character recognition processing for a sign or the like for which a corresponding character code is present.

The image processing unit 161 can shape, through another kind of image processing, a graph axis 415 not shaped by the character recognition processing in FIG. 14. Specifically, the image processing unit 161 can shape the handwritten distorted graph axis 415 into a straight graph axis by extracting plural feature points of the graph axis 415 through image recognition processing and connecting the plural feature points with a straight line. Examples of the feature points include a point 415a, a point 415b, and an intersection point 415c in the graph axis 415.

As explained above, the projector 101 can erase a handwritten character by the electronic pen 60 and generate the image 306 in which the character is shaped. The projector 101 can more accurately grasp delimiters of numerical values or data by recognizing delimiter characters such as commas.

The detecting units 130 and 131 detect update of the graph object data 123. When the graph object data 123 is updated, the image generating unit 160 may generate an image indicating a graph in a drawing area after the update. Specifically, for example, when the upper half of an ordinate of a frame line is erased in a state in which the image 301 shown in FIG. 3 is projected, the image generating unit 160 may generate a graph image obtained by reducing the graph image 500 in the vertical direction. Consequently, the projectors 100 and 101 can update a drawing area for a graph and generate a graph image according to a drawing area for a graph updated by handwriting input.

The detecting units 130 and 131 detect update of the data object data 124. When the data object data 124 is updated, the image generating unit 160 may generate an image indicating a graph that reflects data after the update. Specifically, for example, when a numerical value "30" is erased and a numerical value "50" is drawn in a state in which the image 301 shown in FIG. 3 is projected, the image generating unit 160 may generate a graph image indicating a bar graph in a position above the drawn numerical value "50". In this case, since a maximum is updated, the image generating unit 160 may adjust the length of bar graphs of "10" and "40" according to the maximum. Consequently, the projector 100 can update data of a graph and generate a new graph image according to data of a graph updated by handwriting input.

In the embodiments explained above, the default setting set when an input indicating a type of a graph is absent as an input object is fixed to the bar graph. However, the default setting is not limited to this. Various types of graphs such as a pie graph and a line graph may be set as the default setting.

In the embodiments explained above, the image processing unit 161 performs, in shaping the graph axis 415, the image recognition processing for extracting feature points. However, when a type of a graph indicates a graph that requires the x axis and the y axis like the bar graph shown in FIG. 13, the image processing unit 161 may display straight lines on the left side and the lower side of the graph area 412 as graph axes.

In the embodiments explained above, the image processing unit 161 of the projectors 100 and 101 performs the character recognition processing and the image recognition processing. However, a not-shown PC connected to the projectors 100 and 101 may perform the character recognition processing and the image recognition processing.

In the embodiments explained above, the detecting units 130 and 131 identify objects on the basis of input coordinate positions. However, the detecting units 130 and 131 may identify the objects on the basis of input hours or may identify the objects on the basis of the input coordinate positions and the input hours.

In the embodiments explained above, an ID is used for identification of an input object. However, a pointer indicating an address of data in a storage area of the storing unit 120 may be used instead of the ID. In this case, for example, graph object data is data indicating, for example, a coordinate position at the time of input, an input hour, and a grouping flag indicating whether a graph can be drawn. Data object data is data indicating, for example, a coordinate position at the time of input, an input hour, a numerical value, the number of data forming a graph, and a grouping flag. Type object data is data indicating, for example, a coordinate position at the time of input, an input hour, a graph type, and a grouping flag.

In this case, group data in which a pointer to the graph object data, a pointer to the data object data, a pointer to the type object data, a drawing flag indicating whether a graph is already generated, and the like are provided for each group (graph) may be stored. For example, in the case of the second embodiment, when all three objects, i.e., a graph object, a data object, and a type object match, the updating unit 140 may update the grouping flags of the data from false to true. The image generating unit 160 may generate a graph image referring to group data in which a drawing flag is "false". The updating unit 140 may update the drawing flag of the group, for which the graph image is generated, from "false" to "true" according to the generation.

In the embodiments explained above, input object data is generated on the basis of image pickup information by the image pickup unit 110. However, the input object data may be generated by detecting an input position according to, for example, reception of an infrared ray, a pressure sensitive method, or an electrostatic method.

Computers included in the projectors 100 and 101 may read a computer program stored in an information storage medium and function as the detecting units 130 and 131 and the like. As such an information storage medium, for example, a CD-ROM, a DVD-ROM, a ROM, a RAM, and a HDD can be applied.

Apparatuses on which the image generating apparatuses 102 and 103 can be mounted are not limited to the projectors 100 and 101 and may be, for example, a large display and a whiteboard having a function of receiving a handwritten input on a presentation screen, display apparatuses such as a portable information terminal and a notebook PC that receive a handwritten input according to the electrostatic method, and printing apparatuses such as a printer. The image generating apparatuses 102 and 103 may write out image data indicating a generated graph image to the information storage medium or the like or distribute the image data to a terminal apparatus.

In the embodiments explained above, the projectors 100 and 101 of the short focus type fixed to the wall via the fitting 30 are used. However, a usual front projection projector which is placed on a floor or hung from a ceiling or rear projection projector may be used. When the projectors 100 and 101 are used while being placed on the floor, a character or the like may be drawn and an input object indicating the character or the like may be input by a mouse or the like connected to the projector.

The projectors 100 and 101 are not limited to a liquid crystal projector (a transmission type or a reflection type such as an LCOS). The projectors 100 and 101 may be, for example, a projector including a digital micro mirror device. The projecting unit 190 may adopt, instead of the lamp, a self-luminous element including a solid-state light source such as an organic EL element, a silicon light-emitting element, a laser diode, or an LED. The functions of the projectors 100 and 101 may be distributed to plural apparatuses (e.g., a PC and a projector or a digital camera and a projector).

What is claimed is:

1. An image generating apparatus comprising:
    an image pickup unit that picks up an image of a drawing area, including an input object input by handwriting on the drawing area, at a plurality of fixed times and generates image pickup information indicating the picked-up image of the drawing area including the input object, the input object including
        a graph object indicating a graph area for drawing a graph on the drawing area,
        a data object indicating data for forming a graph, and
        a type object indicating a type of graph;
    an updating unit that continuously updates input object data indicating contents of the input object on the basis of the image pickup information;
    a detecting unit that detects, from the input object data, graph object data, data object data, and type object data; and
    an image generating unit that generates a graph image in the drawing area, on the basis of the graph object data, the data object data, and the type object data,
    wherein, when the graph object, data object, or type object of the input object is updated by changing the handwriting on the drawing area, the image generating unit generates a new graph image and replaces the previous graph image in the drawing area with the new graph image, based on the updated graph object data, data object data, and type object data.

2. The image generating apparatus according to claim 1, wherein
    the graph included in the image generated by the image generating unit corresponds to the type of the graph in the drawing area on the basis of the graph object data, the data object data, and the type object data.

3. The image generating apparatus according to claim 1, wherein
    the detecting unit detects update of the type object data, and
    the image generating unit generates an image including the graph corresponding to a type of a graph indicated by the type object data after the update.

4. The image generating apparatus according to claim 3, wherein
    the detecting unit detects update of any one of the type object data, the graph object data, and the data object data and, when any one of the data other than the data, the update of which is detected, is present in the image including the graph, allocates a same ID to the data, the update of which is detected, and the data present in the image, and
    the image generating unit generates, on the basis of generation completion flags respectively included in the plural data to which the same ID is allocated, an image including a graph that reflects contents of the update indicated by the data after the update.

5. The image generating apparatus according to claim 1, wherein
    the detecting unit detects update of the graph object data, and
    the image generating unit generates an image including the graph in a drawing area for a graph indicated by the graph object data after the update.

6. The image generating apparatus according to claim 1, wherein
    the detecting unit detects update of the data object data, and
    the image generating unit generates an image including the graph that reflects data of a graph indicated by the data object data after the update.

7. The image generating apparatus according to claim 1, further comprising a storing unit that stores default setting indicating a type of a graph, wherein
    when the detecting unit does not detect data indicating the type of the graph as the input object data, the image generating unit generates an image including the graph corresponding to the type of the graph indicated by the default setting on the basis of the graph object data, the data object data, and the default setting.

8. The image generating apparatus according to claim 1, wherein
the detecting unit detects, from the input object data, data indicating an attribute corresponding to the data indicated by the data object data, and
the image generating unit generates an image including the graph in the drawing area on the basis of the graph object data, the data object data, the type object data, and the data indicating the attribute.

9. The image generating apparatus according to claim 8, further comprising an image processing unit that applies character recognition processing to the image generated by the image generating unit, wherein
the image generating unit erases input objects respectively corresponding to the data object data, the type object data, and the data indicating the attribute from the image, and the image processing unit applies the character recognition processing to the generated image, whereby the image generating unit generates an image in which a character included in the image is shaped.

10. A projector comprising:
the image generating apparatus according to claim 1, and
a projecting unit that projects an image including the graph on an area where the handwriting input is performed.

11. A non-transitory computer-readable storage medium having recorded therein a computer program for causing a computer to execute processing for:
picking up an image of a drawing area including an input object input by handwriting on the drawing area, at a plurality of fixed times and generating image pickup information indicating the picked-up image of the drawing area including the input object, the input object including
a graph object indicating a graph area for drawing a graph on the drawing area,
a data object indicating data for forming a graph, and
a type object indicating a type of graph;
continuously updating input object data indicating contents of the input object on the basis of the image pickup information;
detecting, from the input object data, graph object data, data object data, and type object data; and
generating a graph image in the drawing area, on the basis of the graph object data, the data object data, and the type object data,
wherein, when the graph object, data object, or type object of the input object is updated by changing the handwriting on the drawing area, a new graph image is generated and replaces the previous graph image in the drawing area with the new graph image, based on the updated graph object data, data object data, and type object data.

12. An image generating method for an image generating apparatus, comprising:
picking up an image of a drawing area including an input object input by handwriting on the drawing area, at a plurality of fixed times and generating image pickup information indicating the picked-up image of the drawing area including the input object, the input object including
a graph object indicating a graph area for drawing a graph on the drawing area,
a data object indicating data for forming a graph, and
a type object indicating a type of graph;
continuously updating input object data indicating contents of the input object on the basis of the image pickup information;
detecting, from the input object data, graph object data, data object data, and type object data; and
generating a graph image in the drawing area, on the basis of the graph object data, the data object data, and the type object data,
wherein, when the graph object, data object, or type object of the input object is updated by changing the handwriting on the drawing area, a new graph image is generated and replaces the previous graph image in the drawing area with the new graph image, based on the updated graph object data, data object data, and type object data.

13. The image generating method for an image generating apparatus according to claim 12, wherein:
the graph corresponds to the type of the graph in the drawing area on the basis of the graph object data, the data object data, and the type object data.

14. The image generating method for an image generating apparatus according to claim 12, further comprising:
detecting update of the type object data; and
generating an image including a graph corresponding to a type of a graph indicated by the type object data after the update.

15. The image generating method for an image generating apparatus according to claim 14, further comprising:
detecting update of any one of the type object data, the graph object data, and the data object data;
allocating, when any one of the data other than the data, the update of which is detected, is present in the image including the graph, a same ID to the data, the update of which is detected, and the data present in the image; and
generating, on the basis of generation completion flags respectively included in the plural data to which the same ID is allocated, an image including a graph that reflects contents of the update indicated by the data after the update.

16. The image generating method for an image generating apparatus according to claim 12, further comprising:
detecting update of the graph object data; and
generating an image including a graph in a drawing area for a graph indicated by the graph object data after the update.

17. The image generating method for an image generating apparatus according to claim 12, further comprising:
detecting update of the data object data; and
generating an image including a graph that reflects data of a graph indicated by the data object data after the update.

18. The image generating method for an image generating apparatus according to claim 12, further comprising:
storing default setting indicating a type of a graph;
generating, when data indicating the type of the graph is not detected as the input object data, an image including a graph corresponding to the type of the graph indicated by the default setting on the basis of the graph object data, the data object data, and the default setting.

19. The image generating method for an image generating apparatus according to claim 12, further comprising:
detecting, from the input object data, data indicating an attribute corresponding to the data indicated by the data object data; and
generating an image including a graph in the drawing area on the basis of the graph object data, the data object data, the type object data, and the data indicating the attribute.

20. The image generating method for an image generating apparatus according to claim 19, further comprising:

applying character recognition processing to the generated image;
erasing input objects respectively corresponding to the data object data, the type object data, and the data indicating the attribute from the image; and
generating an image in which a character included in the image is shaped.

\* \* \* \* \*